United States Patent
Verma et al.

(10) Patent No.: US 7,921,030 B1
(45) Date of Patent: *Apr. 5, 2011

(54) PROFIT OPTIMIZATION SYSTEM FOR SUPPLY CHAINS WITH LIMITED PARTS AVAILABILITY

(75) Inventors: Sushil Kumar Verma, Redwood City, CA (US); Robert D. Pierce, Albany, CA (US); Hau Leung Lee, Los Altos Hills, CA (US)

(73) Assignee: SignalDemand, Inc., San Francisco, CA (US)

( * ) Notice: Subject to any disclaimer, the term of this patent is extended or adjusted under 35 U.S.C. 154(b) by 1338 days.

This patent is subject to a terminal disclaimer.

(21) Appl. No.: 11/398,341

(22) Filed: Apr. 4, 2006

(51) Int. Cl.
 *G06Q 99/00* (2006.01)
(52) U.S. Cl. ............... 705/10; 705/1.1; 705/26; 705/28; 705/400; 717/105
(58) Field of Classification Search ............ 705/1.1, 705/7–8, 10, 28, 35, 400, 26; 700/99; 1/1; 715/700; 717/105
 See application file for complete search history.

(56) References Cited

U.S. PATENT DOCUMENTS

| | | | |
|---|---|---|---|
| 5,287,267 A * | 2/1994 | Jayaraman et al. | 705/10 |
| 5,604,854 A | 2/1997 | Glassey | |
| 5,630,070 A * | 5/1997 | Dietrich et al. | 705/8 |
| 5,926,822 A | 7/1999 | Garman | |
| 6,092,050 A | 7/2000 | Lungren et al. | |
| 6,167,380 A * | 12/2000 | Kennedy et al. | 705/10 |
| 6,456,982 B1 | 9/2002 | Pilipovic | |
| 6,553,352 B2 | 4/2003 | Delurgio et al. | |
| 6,606,527 B2 * | 8/2003 | de Andrade et al. | 700/97 |
| 6,851,604 B2 | 2/2005 | Girotto et al. | |
| 6,892,195 B2 | 5/2005 | Lee et al. | |
| 7,249,068 B1 * | 7/2007 | Kakouros et al. | 705/28 |
| 7,552,095 B2 * | 6/2009 | Kalyan | 705/400 |
| 7,590,937 B2 * | 9/2009 | Jacobus et al. | 715/700 |
| 7,593,871 B1 * | 9/2009 | Mesaros | 705/26 |
| 7,693,748 B1 * | 4/2010 | Mesaros | 705/26 |
| 2001/0037321 A1 | 11/2001 | Fishman et al. | |
| 2003/0110072 A1 | 6/2003 | Delurgio et al. | |
| 2003/0110104 A1 * | 6/2003 | King et al. | 705/28 |
| 2006/0173728 A1 * | 8/2006 | An et al. | 705/10 |

FOREIGN PATENT DOCUMENTS

JP 09073491 A * 3/1997

OTHER PUBLICATIONS

"Ventura Foods, LLC Selects Pricing and Promotion Optimization Solution from SignalDemand", Apr. 10, 2006; 2 pgs.*

(Continued)

*Primary Examiner* — John W Hayes
*Assistant Examiner* — Freda A Nelson
(74) *Attorney, Agent, or Firm* — Treyz Law Group; G. Victor Treyz; Nancy Y. Ru (57) ABSTRACT

A computer-based profit optimization model is provided that takes account of supply-side and demand-side factors in optimizing profit for an organization. The model takes into account which parts the organization uses to assemble various products. Demand curves are used to characterize the quantity of each product that will be demanded for various classes of product and classes of customer. Supply model data is used to determine which mix of products can be sold in view of parts availability. Using the demand model and supply model data, the optimization model can recommend a set of prices to use for selling the organization's products to various customers and at various shipment times. The model ensures that the organization has sufficient resources available to produce the products and enforces user-supplied business rules and other constraints.

12 Claims, 5 Drawing Sheets

OTHER PUBLICATIONS

Stahl, Nicole Zaro; "Programs for Profit: Software Helps Improve the Bottom Line", Dec. 2006, Meat Processing, pp. 37-39 (2 pgs).*

"SignalDemand Closes $7.5 Million in Series B Funding: Financing to Expand Development of Sales and Profit Optimization Software for Food and Consumer Goods Manufacturers", Jan. 23, 2006, Business Wire, BNET, 5 pgs.*

U.S. Appl. No. 11/200,548, filed Aug. 9, 2005, Verma et al.

* cited by examiner

PROFIT OPTIMIZATION SYSTEM FOR SUPPLY CHAINS WITH LIMITED PARTS AVAILABILITY

BACKGROUND OF THE INVENTION

This invention relates to tools for optimizing profits, and more particularly, to tools for determining how best to optimize profits when manufacturing and selling products that are assembled from supply chains with limited parts availability.

Business planning tools are currently available to assist an organization in maximizing its profits. In a typical scenario, an organization might use a forecasting model to predict the quantity of a product that will be sold at some time in the future. By predicting demand in this way, the organization can order sufficient materials to produce the predicted quantity of product that will be sold.

Although simple demand forecasts of this type are useful, they do not take account of supply and demand factors in an integrated fashion. For example, conventional forecasts do not take into account demand elasticity and the different profit margins of different products that can be assembled from the same parts. As a result, traditional planning tools do not allow organizations to truly maximize profit.

There is therefore a need for improved business planning tools to help an organization maximize profits.

SUMMARY OF THE INVENTION

In accordance with the present invention, methods and apparatus are provided for optimizing an organization's profit in selling products to customers. Products being sold may be organized into price groups of closely related products. Customers may be organized into groups of related customers called customer classes. An optimization model considers supply-side and demand-side data in determining optimal prices and associated sales quantities for various combinations of price groups and customer classes. Products are ordered by customers at an order time period. Products are shipped during a shipment time period that is greater than or equal to the order time period. During optimization operations, the optimization model determines optimal prices for multiple shipment periods.

The products are assembled from available parts. In a typical scenario, the available parts are primarily obtained from inventory (i.e., the majority of the parts used are already in the inventory of the organization). Supply inventory may be considered to include materials scheduled for delivery and use during a given production period.

The optimization model is used to determine which prices an organization should use in selling its products for each price group, customer class, and shipment time period. Suggested sales prices are produced by the model. The optimization model ensures that the proposed sales prices that are generated have an associated feasible production plan. This ensures that the organization can assemble the projected quantities of products that will be sold from available parts.

The optimization model preferably enforces user-supplied business rules. For example, the organization may require that a high-grade product sell for a price that is higher than a low-grade product. The optimization model also preferably takes account of oversold quantities and desired lower bound sales quantities. By considering constraints such as these, the organization may ensure that its business reputation is maintained.

If desired, the optimization model may produce a production plan for use by the organization. The production plan may specify the quantity of parts that are to be used to fabricate each product.

Further features of the invention, its nature and various advantages will be more apparent from the accompanying drawings and the following detailed description of the preferred embodiments.

DETAILED DESCRIPTION OF THE PREFERRED EMBODIMENTS

The present invention relates to modeling systems and methods that are used by businesses to optimize their profits. The optimization techniques of the present invention apply particularly to optimization of profit generated through sales from a short lead-time supply chain with fixed parts availability.

Optimization operations are performed by a computer-implemented optimization model. The optimization model takes into account various tradeoffs and constraints faced by an organization. One tradeoff that is considered relates to demand elasticity. Most products have an elastic demand in that the quantity of the product that is sold increases as a function of decreasing price. If Q represents the quantity of a product sold and P represents its price, the slope of the Q versus P demand curve is indicative of its elasticity. Traditionally elasticity is measured as a unitless ratio: $(dQ/dP)(P/Q)$. Because demand for most products is elastic, there is a tradeoff between the selling price for a product and the likelihood of selling that product. The amount of product that can be moved through a sales channel therefore increases as price is reduced.

Another tradeoff that the optimization model takes into account relates to profit margins. Not all products have the same profit margin. An organization may therefore be able to maximize profits by adjusting the mix of products it sells.

The optimization model also preferably takes into account the ability of a seller to sell different quantities of product to different groups of customers. As an example, a seller may, within seller-defined limits, sell products to either a group of retail buyers or a group of wholesale buyers. Groups of related customers are sometimes referred to as customer classes. The optimization model of the present invention preferably handles multiple customer classes. In situations where a seller is selling product to multiple customer classes, the optimization model can consider the impact of selling different products and different amounts of products to different customer classes. The optimization model may, as an example, consider the impact of selling less product at a higher margin to a retail customer class versus selling more product at a lower margin to a wholesale customer class.

The optimization model also preferably takes into account tradeoffs involved in selling products during different sales periods. The model may, as an example, consider the impact of selling a quantity of a particular product during a current time period versus holding that quantity of product for sales during a different time period. Different shipment time periods can also be considered.

The tradeoffs considered by the optimization model are interrelated. For example, if an organization desires to increase profits by selling more of a high margin product, the organization will need to consider reducing that product's price to achieve a desired sales volume. Because reducing the product's price will reduce its margin, both demand elasticity and margin effects should be considered. The optimization model may use any suitable demand elasticity formulation to model demand. With one suitable approach, the optimization model uses a logarithmic demand elasticity model.

Tradeoffs are made in view of a number of constraints.

For example, the optimization model generally assumes that the quantities of parts that are available to produce the products is limited. If more of a particular type of part is used to create a high-margin product (as an example), less of that part will be available to create a low-margin product.

The model also generally gives existing orders priority over new orders. An organization will damage its reputation if it is not able to meet its existing commitments. Another constraint that is preferably taken into account relates to the interrelationships of prices for different products. For example, it is generally not acceptable from a business perspective for an organization to sell a premium product for less than it sells a regular product. This imposes a price restriction on the premium and regular products. Constraints such as these are reflected by incorporating business rules into the optimization model.

The model assumes that production takes place just before or during a shipment time period. Orders can be taken up to and during the shipment time period.

Even if a portion of an organization's business is not being optimized (e.g., the production of certain products is not being placed under consideration by the optimization model), the requirements of that portion of the business must still be taken into account. For example, if a non-optimized portion of the business requires a certain supply of parts, those parts must be deducted from the number of parts that would otherwise be available.

The model is provided with information on the relationships between parts and products. Certain products can be formed using a variety of parts, so the optimization model can identify part substitution schemes that maximize profit. Other products can be formed only with particular parts.

Limitations on market changes can be taken into account. In general, the impact of product's price on the sales volume is not unlimited. Prices and quantities carry a certain amount of inertia before they can be affected. The optimization model may therefore impose limits on how much prices and sales quantities can change.

The optimization model preferably produces suggested prices for each product under consideration. The suggested price for each product will shape its demand so as to produce an optimum overall profit level.

Products may be organized in sets called product classes or price groups. (Terms such as "products" and "price groups" are sometimes used interchangeably.) Not all products need be placed under consideration when running an optimization. For example, certain products can be left out of consideration. The products that are not considered (the non-optimized price groups) still consume the resources of the organization, but their production levels are considered to be constant. Similarly, not all customers need be included in an optimization. The customer classes that are included in the optimization process are referred to as the optimized customer classes.

The optimization model preferably produces optimized prices for each optimized price group and customer class. This set of optimized prices is expected to maximize the organization's profit.

The quantity of each product that is expected to be sold at its suggested price may be provided to the user. The model ensures that the expected product quantities may be produced by a feasible production plan. The quantities and prices may be considered to be an optimized forecast.

A high level production plan may also be generated. The production plan specifies how available parts can be used to produce the products needed to fulfill existing orders, forecasted commitments to non-optimized customer classes, and optimized projections for optimized customer classes.

The optimization model preferably allows an organization to manage risk. Pricing decisions carry risk. For example, if it is desired to increase sales for a particular product by lowering price, there is a risk that the lowered price will reduce per item revenues without producing the expected increase in sales volume. Sales volumes are affected by a variety of factors, which may outweigh the organization's pricing decision.

To manage risks such as these, the optimization model can produce both suggested optimum prices and error estimates. For example, the model may produce a range of suggested prices that falls within a single standard deviation of the expected optimum price. Error estimates may be generated to provide a user with an indication of the magnitude of risk involved with adopting the proposed prices. This data provides price managers information that can be used to quantify the amount of risk to profit that is associated with adopting a proposed optimum price. As a default, the optimization model accepts an average amount of risk when computing optimum prices. If desired, the optimization model may allow an organization to take a more conservative or a more aggressive stance when calculating the suggested optimum price. Sales may also be ramped-up or ramped-down more aggressively if desired. This may be achieved by relaxing default week-to-week price change limits imposed by the optimization model.

The optimization model captures both supply-side and demand-side effects. On the demand side, the model uses a suitable demand elasticity function such as a demand elasticity function based on a logarithmic demand elasticity model. These demand model functions represent sales volume (e.g., sales volume in any given week or other suitable time period) as a function of sales price. The demand function may take into account other variables as well, including cross-elasticity effects of related product prices.

On the supply side, the optimization model preferably operates using a number of model assumptions which are appropriate for short lead-time markets.

One model assumption is that the production process being modeled is an assembly process. In an assembly process, finished goods are constructed from constituent parts. For example, the finished goods may be printed circuit boards and the constituent parts may be integrated circuits. The assembly process being modeled permits one or more alternate "recipes" to be used in constructing finished goods. For example, alternate bills of material may be used to assemble a given finished good. A circuit board might, as an example, be assembled from different groups of integrated circuits.

Another model assumption relates to manufacturing lead time. In particular, the optimization model of the invention assumes that the manufacturing process being modeled has a short lead time. The optimization model has two time-based indices: t and τ. The index t represents the time at which the product will be shipped (i.e., shipment time). The index τ represents the order time period (i.e., the time period in which product sales are made). The model handles multiple order time periods τ and multiple shipment time periods t. In general, shipments are made in a relatively short time after an order is taken. For example, the shipment time period t may be 3-8 weeks after the current order time period τ=1. Sales and shipments time periods may be represented using any suitable time bucket size (e.g., weeks, months, etc.). The time period over which the optimization model operates is sometimes referred to as the optimization horizon. The optimization horizon is typically a number of weeks (e.g., 3-8 weeks). The short manufacturing lead time is typically significantly less than the optimization horizon. For example, the manufacturing lead time may be less than 5% of the optimization horizon. Because manufacturing lead times are required to be short, each product is produced at a production time period that is adjacent to or identical to the shipment time period for that product. For example, if the shipment time period for a given product is five weeks from the current time period, the short manufacturing lead time requirement is satisfied by production taking place at production time periods of four weeks or five weeks from the current time period. As another example, if the shipment time period for a product is three months from the current date, production takes place at two or three months from the current data.

Another model assumption relates to manufacturing capacity. In particular, the model assumes that production capacity is essentially unlimited (e.g., due to external limits such as labor constraints and machine capacity). The quantity of finished goods that can be produced is only limited by the quantity of parts that are available in the short lead time covered by the model.

The optimization model preferably assumes that product production takes place just before or during shipment time period t. Orders can be taken up to and during the shipment time period t. The model determines optimal prices for orders being taken in the current time period τ=1. The model calculates expected optimized prices for orders that will be taken during upcoming time periods (i.e., time periods τ>1), but these prices are not generally made available to the user.

The model uses indices i and c. The index i represents price groups (i.e., sets of closely related products that are treated as a single product by the model). The index c represents customer classes (groups of related customers). The optimization model need not optimize prices for all price groups and all customer classes. In general, only some price groups and some customer classes are optimized for prices.

During demand estimation operations, the optimization model preferably uses demand estimation tools to produce a group of market reference sales quantities $Q'_{ic}(t,\tau)$. Each quantity $Q'_{ic}(t,\tau)$ represents the fraction of final sales against a final sales shipment period t that is made in order time period τ. The quantities $Q'_{ic}(t,\tau)$ form a reference profile defining what fraction of parts availability is sold at various times in advance of the shipment time period t. Deviations from this profile in relative or absolute terms can affect price and therefore profit. The model preferably uses a single market reference price for shipments to be made during a particular time period independent of when orders for these shipments are taken. The market reference price will generally change as more information becomes available. Deviations from the market reference price affect sales volume predictions made by the model.

The optimization model may use relativized price and log (quantity) equations.

On the supply side, the model is valid for any sets of products whose production lead time is small in comparison to the length of the forward sales horizon. The products that are being manufactured are typically short shelf life products that are shipped soon after they are manufactured. Product shelf life should generally be of the same order as the duration of the shipment time bucket (e.g., one month, one week, or other suitable period). If desired, the optimization model can be applied to made-to-order production environments with short production lead times, short shelf-lives, and fixed (or nearly fixed) plant operating hours.

The production processes modeled by the optimization model are based on assembly operations in which a product "assembly" (product) is assembled from constituent "parts." The products can be produced in a variety of ways. For example, product 1 can be produced using parts A, B, and C or parts B, C, D, and E, whereas product 2 can be produced using parts X, Y, and Z or parts Y and W. "Parts" may be generalized to refer to a physical component or a manufacturing process. For example, using a military quality soldering process on a circuit board may be recorded as a component in the bill of material.

There are structural relationships between parts and products that reflect the different possible ways in which products may be assembled. For example, an assembled circuit board might be produced using an unpopulated circuit board and a variety of chips. The parts in this type of scenario are the unpopulated circuit board and the integrated circuits chips. The products are the assembled circuit boards. The organization in this example (e.g., a board assembly factory) has flexibility in determining which boards to produce. For example, with a given supply of unpopulated boards and a given supply of premium chips and regular chips, the factory has the ability to produce more premium boards and fewer regular boards or fewer premium boards and more regular boards.

The optimization model preferably represents interrelationships between parts and products using one or more tables or other suitable data structures. These data structures are used to represent the relationships between each product's bill of materials and the parts that are available to the organization. By capturing the structural relationships between parts and products, the optimization system can take into account the tradeoffs involved when deciding what quantities to produce of each product.

Figure 1:
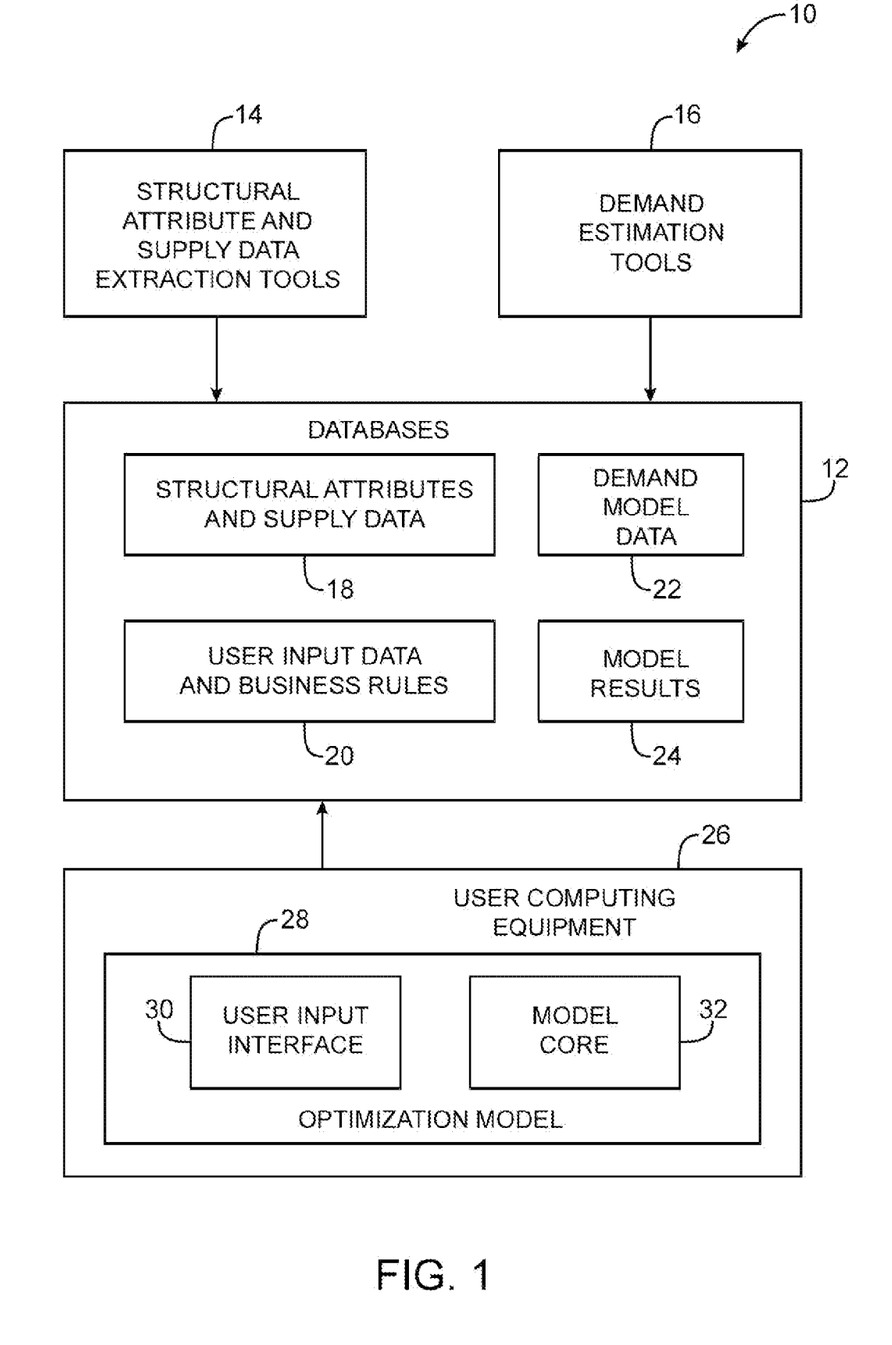
FIG. 1 is a diagram of an illustrative system environment in which an integrated demand and supply optimization model operates in accordance with the present invention.

An illustrative system environment in which an optimization model (tool) in accordance with the present invention may be implemented is shown in FIG. 1. System 10 preferably has one or more databases 12 that are populated using various tools. Databases 12 can be implemented on any suitable computer equipment. For example, databases 12 can be implemented on personal computers, servers, clusters of servers, computers that are networked together at a central location, computers that are located at remote locations and that are networked using a wide area network such as the internet, or any other suitable computing equipment arrangement.

Structural attribute and supply data extraction tools 14 are used to create database entries related to the bills of material used to assemble products from parts. Tools 14 may be used, for example, to create tables that specify which parts are used in each product. If desired, tools 14 may be used to handle multiple layers of bills of material (e.g., bills of material for products, bills of material for components for the products, and bills of material for the parts that are used to form the components).

Data can be entered manually by a user associated with an organization. For example, the structural relationship between a product and its constituent parts may be represented by a table of entries that are manually typed in by a user. Alternatively, or in combination with manual entry techniques, tools 14 can be used to support automatic extraction features. With automatic extraction, existing databases (e.g., bill of material databases already in use by an organization) may be processed automatically to extract structural relationship information.

Demand estimation tools 16 may be used to generate product demand curves. A demand curve for a given product captures the expected sales quantity (Q) for that product versus sales price (P). Tools 16 may include regression analysis tools that fit linear curves, exponential curves, and other suitable curves to sales data. A user can supply tools 16 with the sales data in the form of one or more tables (e.g., tables in one or more data files).

The user can preferably use tools 16 to specify which type of demand curve model is desired (e.g., linear or exponential). Tools 16 then fit the selected curve type to the sales data. A demand curve is typically produced for each price group to be optimized.

User inputs to the profit optimization system can be supplied by a user at user computing equipment 26. Computer equipment 26 may be a personal computer, networked computers, or any other suitable computing equipment on which software models can be run. The computing equipment 26 may be the same computing equipment that is used to implement other system components (e.g., databases 12, demand estimation tools 16, and tools 14), or different computers can be used for different components.

The computing equipment of FIG. 1 includes storage (e.g., volatile and non-volatile memory) and processing circuitry (e.g., microprocessors). The computer equipment runs code (instructions) to implement the optimization methods of the present invention.

Optimization model 28 includes a user input interface 30 and a model core 32. User input interface 30 displays model results to the user (e.g., on a monitor in equipment 26) and gathers input from the user (e.g., through mouse clicks and keyboard entries). Model core 32 implements the demand and supply sides of optimization model 28 in an integrated fashion.

Databases 12 include structural attributes and other supply model data 18. Data 18 may be produced by tools 14. An example of data 18 is the bill of materials data for an organization that specifies how that organization's products are assembled from various parts. This data serves to define and restrict how the product mix sold by the organization can be varied given current parts availability. For example, if more of a particular part is required to produce product A than to produce product B, then it is so accounted for in the optimization model which will, in general, with consumption of other parts being equal, result in a higher price for product A. This restriction is imposed by the structural attribute and other supply model data 18.

Another example of data 18 is data that captures parts availability information. Parts availability data may include data on which parts are available (in a shipment period) and what quantities of parts are available for production (in that shipment period). Data 18 also preferably captures information on preexisting contractual commitments in that shipment period and finished goods in inventory at the beginning of the model optimization horizon.

Data 22 includes demand model data such as the demand curve data generated by demand estimation tools 16. Demand model data 22 may be stored in any suitable format. For example, a linear demand curve can be represented as a slope and intercept value or can be represented using a look-up table of price and quantity values. Data 22 contains demand model data for multiple price groups, multiple customer classes, and multiple shipment and order time periods. This allows the model 28 to evaluate tradeoffs involved in the sales of one product versus another (product mix tradeoffs), tradeoffs involved in selling different quantities of product to different customer classes (customer class tradeoffs), and tradeoffs involved in selling different amounts of product during the current time period versus holding product for later sales (order time-period tradeoffs).

User input data and business rule data 20 includes user-supplied settings from user input interface 30. User-supplied settings include parameters quantifying the amount of risk that the user desires to accept during optimization modeling and bounds on quantity and price within which the optimization operates. Data 20 also includes business rules. The business rules may include default business rules that are built into the system and business rules supplied by a user through user input interface 30. Typical business rules impose restrictions such as restrictions governing the relative prices of various products. A user-supplied or default business rule might, as an example, specify that a premium product must always be sold at a price higher than a comparable non-premium product.

Model results 24 are generated by running the optimization model 28. Typical model results include suggested prices for an organization to use in selling products in various product classes. For example, if there are three products involved in an optimization scenario and a single shipment time period, model results 24 will include three suggested prices. The model preferably also generates corresponding expected sales quantities. When multiple shipment time periods and multiple customer classes are involved, the model produces a set of sales prices and quantities for each shipment time period and customer class. The optimization model 28 ensures that there is a feasible production plan available for any proposed prices. For example, the model 28 will not suggest a price for a product that is so low that the expected quantity demanded for the product would exceed production capacity.

Model results 24 may be provided to a user using any suitable format. For example, results 24 can be provided in a printed report prepared by equipment 26, in a graph, table, or other format displayed on a computer monitor in equipment 26, in a database file maintained in databases 12, etc.

Any suitable data structure format may be used to define the structural relationships between parts and products in data 18. With one suitable arrangement, generic assembly codes are used as product templates. Products are defined in terms of their constituent assemblies. Each generic assembly code contains a number of generic parts and an associated quantity. This type of information may be stored, for example, in database tables. Using codes such as assembly codes and part codes, the parts that make up each price group (product) can be defined.

Supply model data 18 such as parts availability data is used in conjunction with the structural attribute data to define the supply options available to an organization. Because the components of each product are specified by the data 18, the optimization model 28 is able to take account of the parts consumption tradeoffs involved in constructing one product versus another. In general, any product can be manufactured, provided that there are sufficient parts available and provided that bill-of-materials tradeoffs are taken into account.

The optimization model uses index i to represent price groups. Each price group is a set of closely related products that are treated as a single product by the model. Only some price groups may be optimized for prices. The index c is used to represent customer classes. An organization may sell products to different types of buyer. For example, an organization may group its customers into classes such as "retail," "international," "wholesale," "discount," etc. A single customer may be grouped into more than one class depending on purchasing behavior. Because each customer class may have different associated demand curves for different products, the profit optimization operations performed by model 28 preferably take into account multiple customer classes for each product. In general, it is not necessary to perform price optimization operations for all customer classes.

The structural attribute data used to define the supply options available to an organization uses index l to represent parts and uses index j to represent assemblies. Each assembly has one or more parts. Each product (price group) has multiple associated alternate assemblies.

Time is represented using indices t and τ. The index t represents the shipment time (i.e., the time at which the products being sold are shipped). The index τ represents the time when orders are placed. In the model, the value of τ ranges from 1 (the current time) to t.

The optimization horizon over which the optimization model operates is a time period of variable length that is divided up into one or more smaller time buckets of fixed length. The length of each time bucket may be (for example), one week, two weeks, one month, etc. In a typical scenario, the optimization horizon is eight weeks and each time bucket is one week long. In this situation, the current order time period τ (i.e., τ=1) corresponds to the first week of an eight week block of one-week order time periods. The value of t, which represents the shipment time bucket, is eight. During optimization operations, the value of t is used by the model to refer to different order time buckets in the eight-week block. The current time period is represented by τ=1. Internally, the model uses other values of t (e.g., values of 2 through 8 in the present example), but these values are not generally presented to the user.

Figure 2:
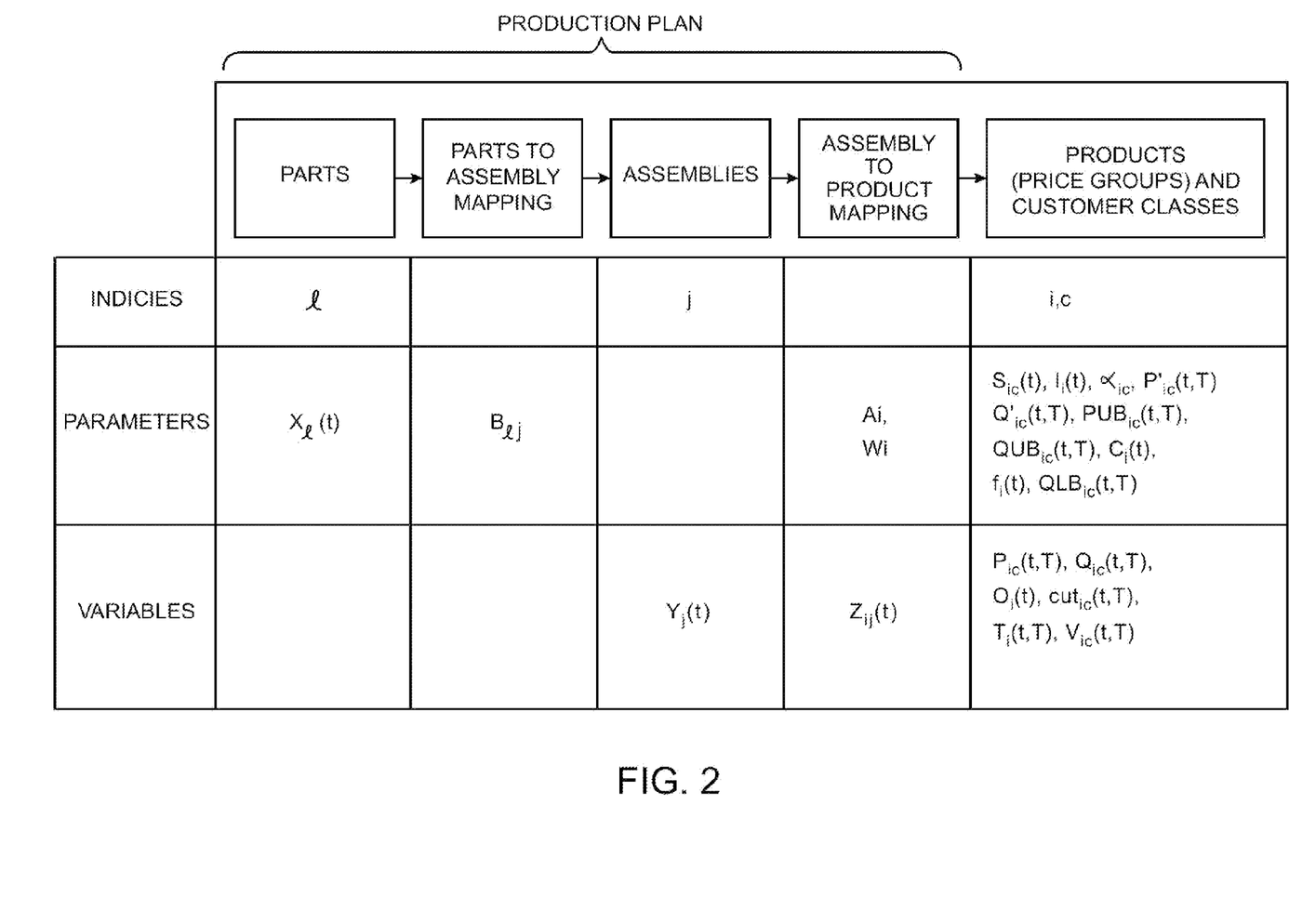
FIG. 2 is a diagram showing the interrelationships between parts, assemblies, and products and associated modeling nomenclature used in the optimization model in accordance with the present invention.

FIG. 2 is a diagram showing the supply-side and demand-side indices, parameters, and variables used by the optimization model 28. Parts and assemblies, are represented by indices l and j, respectively. Products are represented by indices i (price groups) and customers by c (customer classes). For example, the proposed sales price for selling the product of price group i to a buyer in customer class c is $p_{ic}$ and the corresponding projected quantity of sales for price $p_{ic}$ is $Q_{ic}$.

Parameters are generally fixed. Parameter $X_l(t)$ represents the quantity of parts available for part l in shipment/manufacturing time period t. Parameter $S_{ic}(t)$ represents the quantity of product for (i,c) that has already been committed to be shipped in time period t. Parameter $I_i(t)$ represents the quantity of price group i that is in starting inventory and is available to be shipped. Parameter $c_i(t)$ is the marginal cost of producing price group i at time period t. Parameter $A_i$ represents the set of all assemblies that can be used to produce i. Some of the $A_i$ may represent assemblies that are downgraded. Parameter $B_{lj}$ represents the quantity of parts l used to produce assembly j. Parameter $f_i(t)$ represents the fraction of total production of price group i used to satisfy the non-optimized customer classes. The value of $f_i$ may be based on historical data. If desired, the user may adjust the value of $f_i$. Parameter R represents the set of all business rules such as business rules of the form Op(i, c, i', c', t, τ) where (i, c) and (i', c') are optimized price groups and customer classes and Op is a binary operator. The parameter $e_{ic}(t,τ)$ represents the standard error in the price econometric model for optimized (i, c, t). The parameter $r_{ic}(t)$ represents the risk that the user desires to adopt for optimized (i, c, t). A user can use user input interface 30 to adjust the value of $r_{ic}(t)$ to make the model more risky or more conservative, as desired. The parameter $p'_{ic}(t)$ represents a market reference price for optimized (i, c, t). The parameter $Q'_{ic}(t,τ)$ represents a market reference quantity for optimized (i, c, t, τ). The parameter $PUB_{ic}(t)$ represents the upper bound on the price for optimized (i, c, t, τ). The parameter $QUB_{ic}(t,τ)$ represents the upper bound on the quantity for optimized (i, c, t, τ). The parameter $QLB_{ic}(t,τ)$ represents the lower bound on the quantity for optimized (i, c, t, τ). The parameter $α_{ic}$ is the demand elasticity for optimized (i,c). Parameters $PUB_{ic}$, $QUB_{ic}$, and $QLB_{ic}$ can be adjusted by the user (e.g., using user input interface 30 of FIG. 1) to change the characteristics of the model 28.

Variables are not fixed. Rather, during optimization, model 28 determines an optimum set of values for the variables that will maximize profit subject to model constraints. The variables used in the optimization model 28 are non-negative. The variable $p_{ic}(t,τ)$ represents the price per unit for optimized price group i for the optimized customer class c that is ordered at time τ and delivered at time t. The variable $Q_{ic}(t,τ)$ represents the expected sales quantity in units for price group i for the optimized price group i and for the optimized customer class c corresponding to orders at time τ and delivery at time t. The variable $T_i(t,τ)$ is the total quantity in units for price group i for all customer classes (optimized and non-optimized) combined. The variable $O_i(t)$ is the quantity in units for price group i oversold in any customer class for shipment time period t. By including variable $O_i(t)$ in the model, the amount by which a price group is oversold can be minimized. The variable $U_{ic}(t,τ)$ is the unmet lower bound on the quantity for optimized price group i and customer class c. The variable $Z_{ij}(t)$ is the quantity in units of price group i manufactured using assembly j for any customer class at time t. The values of $Z_{ij}$ are used to represent the production plan used by the organization. The variable $Y_j(t)$ is the quantity in units of assembly j manufactured to be used for any customer class at time t. The variable $cut_{ic}(t,τ)$ is the price cut in price for (i, c, t, τ) required to conform to the business rules.

Variables are used to define the recommended price and quantity of each product to be sold. Variables $Y_j$ are associated with assembly quantities. Variables $Z_{ij}$ are used to express the production plan for the organization. When optimization is complete, the production plan information represented by variables $Z_{ij}$ and the other production plan indices, parameters, and variables shown in FIG. 2 can be used to implement a production plan. The plan may be used to guide the organization in producing desired quantities of each product to satisfied forecast demand. If desired, an organization can use the optimization model 28 without relying on the production plan. For example, if the manufacturing lead time is sufficiently short, all production can be made to order and the plan amounts to a demand forecast.

Although model 28 can perform optimization operations for a subset of customer classes and a subset of an organization's products, the model 28 should still satisfy the expected sales for the remaining customer classes and unoptimized products. This ensures that the organization will preserves its business reputation and satisfy its customers.

Figure 3:
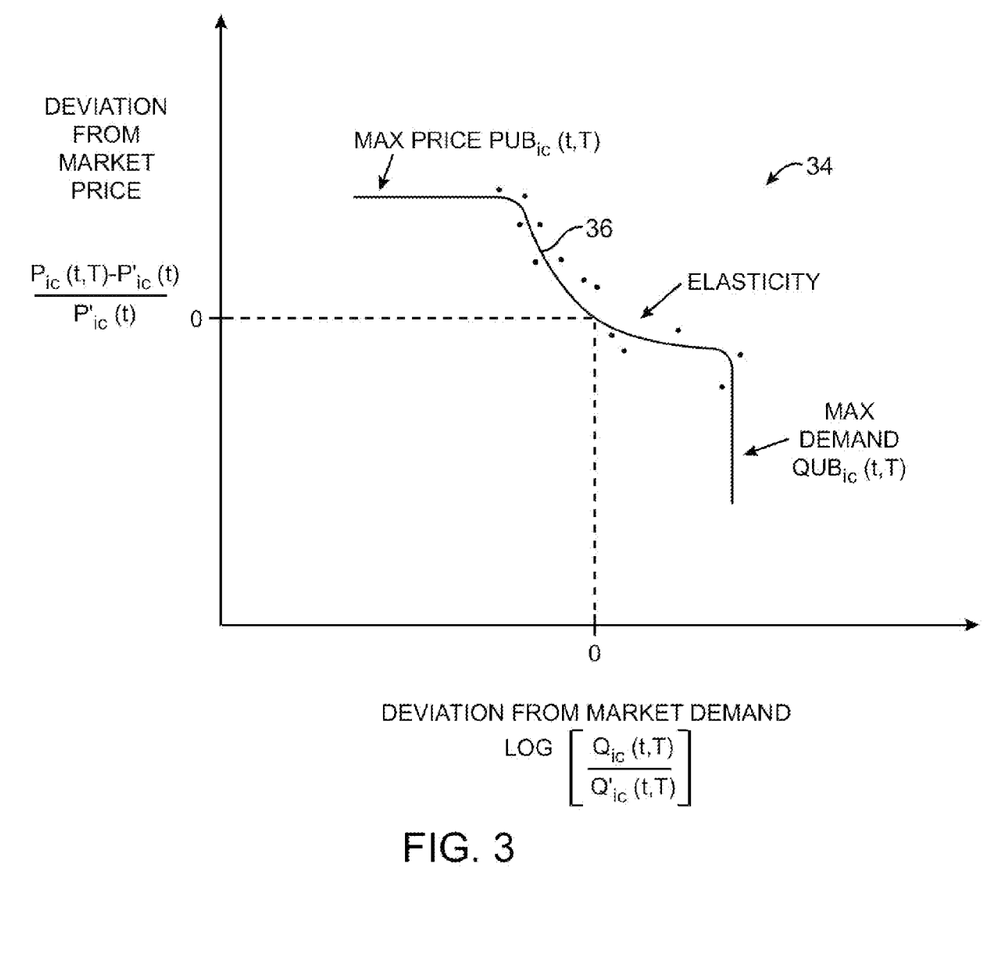
FIG. 3 is a graph of historical sales data showing how a demand modeling tool may be used to extract a demand curve from sales data in accordance with the present invention.

Before optimization results can be calculated by model 28, tools 16 are used to characterize demand for the organization's products. An illustrative demand curve graph for a particular product being sold to a particular customer class is shown in FIG. 3. The data points in graph 34 represent actual sales data. Prices are plotted on the vertical axis of graph 34 as deviations from market price. Sales quantities are plotted on the horizontal axis of graph 34 as deviations from market demand. The sales data may be obtained by mining the organization's databases or from any other suitable source. Maximum price and maximum demand parameters PUB and QUB can be extracted from the sales data by tools 16 or may be supplied by a user.

After obtaining the sales data, the demand extraction tools preferably perform regression analysis or use other suitable techniques to fit a demand curve 36 to the sales data. Any suitable type of modeling analysis may be used to fit the demand curve. Any suitable formulation may be used for the demand curve (e.g., linear, exponential, etc.). The form of the demand curve may be user selectable (e.g., using user input interface 30 of FIG. 1).

Figure 4:
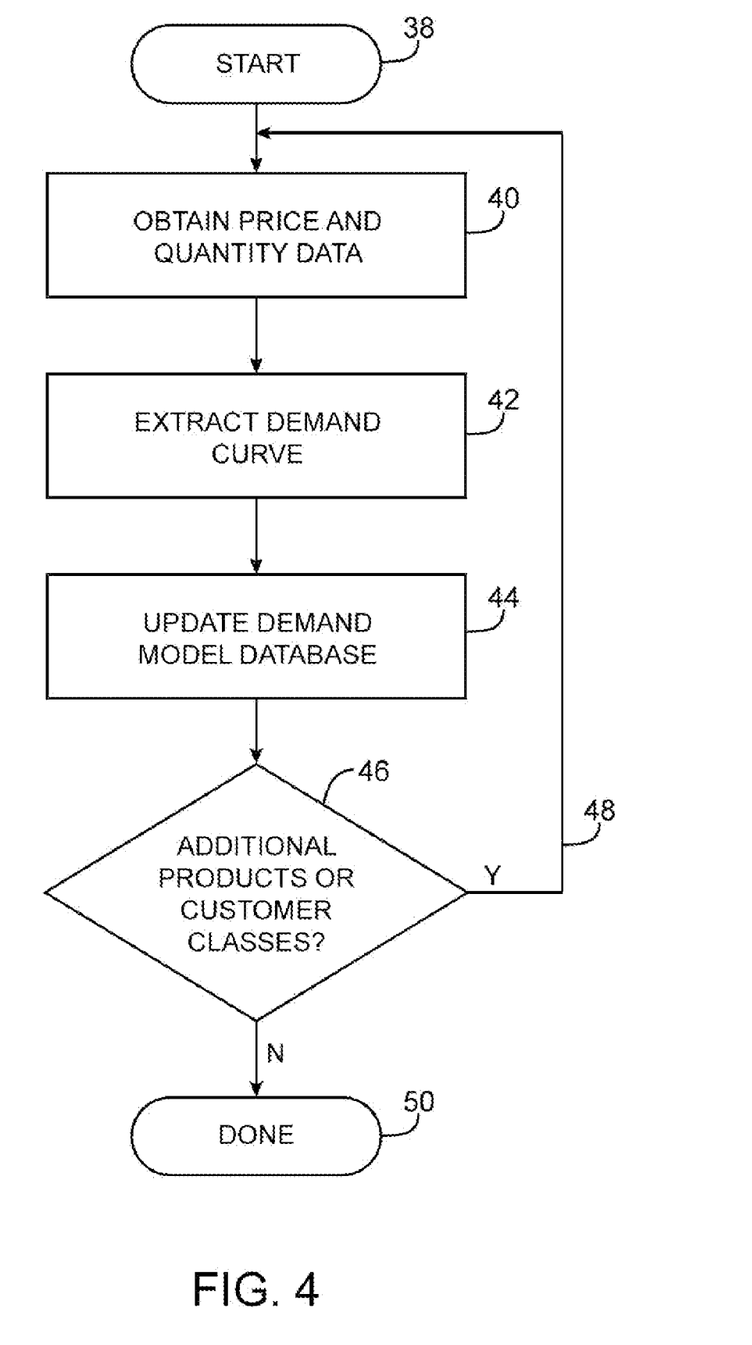
FIG. 4 is a flow chart of illustrative steps involved in extracting a demand curve for a product from sales data of the type shown in FIG. 3 in accordance with the present invention.

Illustrative steps involved in producing demand model data from sales data such as the sales data of FIG. 3 are shown in FIG. 4. Processing is initiated at step 38. At step 40, demand estimation tools 16 obtain sales data. The sales data may be obtained, for example, from sales databases maintained by the organization and/or external sales databases. Sales of the organization, sales by third parties, market demand or supply data supplied by external aggregators, macro economic indicators, competition data and other factors (such as weather data) may be included in the sales data.

At step 42, tools 16 fit a demand curve such as curve 36 of FIG. 3 to the data for a particular product and customer class. At step 44, the tools 16 update databases 12 with information on the extracted demand curve. For example, if tools 16 are fitting a linear demand curve function to the data, tools 16 may provide a demand curve slope and intercept to demand model database 22.

After the demand model data has been updated to reflect the newly extracted demand curve, tools 16 determine whether additional demand curves remain to be extracted (step 46). If additional demand curves are to be extracted, processing loops back to step 38, as shown by line 48. During each pass through the loop of FIG. 11, a demand curve can be extracted for a different price group and customer class. When demand model data has been extracted for all price groups and customer classes, demand curve processing is complete (step 50). The optimization model 28 can then use the demand model data 22 that has been created. The remainder of databases 12 are populated using tools such as tools 14 and user input interface 30.

The optimization model 28 (FIG. 1) uses a series of econometric and supply balance equations to compute optimum sales prices for the optimized price groups and optimized customer classes. In order to find an optimum solution, optimization model 28 uses techniques such as those based upon the reduced gradient method, Newton's method, barriers/penalty methods, or other such techniques to search the space of all solutions without a need to evaluate each and every possible solution.

The model uses equations 1-13.

For all optimized product classes i, equation 1 defines how much quantity is produced to be sold to one or more customer classes.

$$\Sigma Z_{ij}(t) - \Sigma S_{ic}(t) + O_i(t) + I_i(t) = \Sigma T_i(t,\tau) \text{ for all } t \tag{1}$$

The summation $\Sigma Z_{ij}(t)$ is taken over all j. The summation $\Sigma S_{ic}(t)$ is taken over all c. The summation $\Sigma T_i(t,\tau)$ is taken over all $\tau$. Equation 1 serves to quantify the principle of conservation of materials. The term $(\Sigma Z_{ij}(t))$ represents the amount of product that is allocated towards existing commitments and for future sales (i.e., the number of assemblies that the model suggests should be manufactured). The term $\Sigma S_{ic}(t)$ represents the amount of product that has already been sold. Because this product has already been committed, it is not available to be sold. The term $O_i$ represents the amount by which the product is overcommitted (i.e., sold quantities for which parts do not exist in inventory). The term $I_i$ represents products in inventory. The term $\Sigma T_i(t,\tau)$ represents the total product quantity for future sales. The applicability of this model to short lead time manufacturing is evident in equation 1. This equation states that production in period t is expected to be consumed (sold) in period t.

For all unoptimized price groups i over all customer classes, equation 2 ensures that sufficient quantity is produced to satisfy existing orders.

$$\Sigma Z_{ij}(t) - \Sigma S_{ic}(t) + O_i(t) + I_i(t) = 0 \text{ for all } t \tag{2}$$

In equation 2, the summation $\Sigma Z_{ij}(t)$ is taken over all j and the summation $\Sigma S_{ic}(t)$ is taken over all c. Products in unoptimized price groups are rarely sold, so no inventory is generally reserved in the model for future sales of unoptimized price groups. (If desired, however, the model can allow some of the inventory to be reserved for sale in unoptimized price groups.)

For all assemblies j, equation 3 defines the alternate bills of materials.

$$Y_j(t) = \Sigma Z_{ij}(t) \text{ for all } t \tag{3}$$

The summation in equation 3 is taken over all j in $A_i$. The term $\Sigma Z_{ij}(t)$ represents the number of assemblies j that the model suggests should be manufactured against price group i.

For all parts l, equation 4 defines each bill of materials and ensures that the amount of each part does not exceed availability for that part.

$$X_l(t) \geq \Sigma B_{lj} Y_j(t) \text{ for all } t \tag{4}$$

In equation 4, the summation is over all l in $B_j$. The term on the left side of equation 4 is a measure of availability. The term on the right side of equation 4 takes account of production (i.e., the quantity of parts consumed).

For all optimized price groups i, equation defines how much of the production will be allocated to sales of the optimized customer classes.

$$\Sigma T_i(t,\tau)*(1-f_i(t)) = \Sigma Q_{ic}(t,\tau) \text{ for all } t \tag{5}$$

The summation in the term $\Sigma T_i(t,\tau)$ is taken over all $\tau$. The term $\Sigma T_i(t,\tau)$ represents the total quantity of future sales for price group i. The term $1-f_i(t)$ represents the fraction of the total sales for the optimized customer classes. The summation in the term $\Sigma Q_{ic}(t,\tau)$ is taken over all c and $\tau$. The term $\Sigma Q_{ic}(t,\tau)$ represents the total quantity of future sales in the optimized customer classes.

For all optimized price groups i and customer classes c, equation 6 defines the price econometric model for all t and $\tau$.

$$p_{ic}(t,\tau) = \alpha_{ic}(\text{LOG}(Q_{ic}(t,\tau)) - \text{LOG}(Q'_{ic}(t,\tau))) + p'_{ic}(t) - e_{ic}(t,\tau)r_{ic}(t) - cut_{ic}(t,\tau) \tag{6}$$

Parameters such as $\alpha_{ic}$, $Q'_{ic}$, $p'_{ic}$, and $e_{ic}$ may be estimated from sales data using demand estimation tools 16. The formula of equation 6 reflects a user's choice of an exponential-form demand curve. If demand is modeled using another formulation (e.g., a linear model), a corresponding formulation for equation 6 can be used by model 28.

Equation 7 defines the business rules $Op(i,c,i',c',t,\tau)$ which interconnect the price of different optimized price groups and customer classes.

$$p_{ic}(t,\tau) \leq p_{i'c'}(t,\tau) \tag{7}$$

Equation 7 holds for each i, c, i', c', t, and $\tau$ in Op.

Equation 8 enforces the upper bound on prices for optimized price groups i and customer classes c.

$$p_{ic}(t,\tau) \leq PUB_{ic}(t) \text{ for all } t \text{ and } \tau \tag{8}$$

Equation 9 enforces the upper bound on quantities for optimized price groups i and customer classes c.

$$Q_{ic}(t,\tau) \leq QUB_{ic}(t,\tau) \text{ for all } t \text{ and } \tau \tag{9}$$

Equation 10 is used to enforce the lower bound on quantities for optimized price groups i and customer classes c.

$$Q_{ic}(t,\tau) \geq QLB_{ic}(t,\tau) - U_{ic}(t,\tau) \text{ for all } t \text{ and } \tau \tag{10}$$

Whereas equation 9 represents a "hard" upper bound that can be enforced by the organization, equation 10 represents a soft lower bound, as one cannot always force sales of a particular quantity onto the market.

The primary objective of the optimization model 28 is to maximize the overall profit generated from sales of optimized price groups in each optimized customer class, as shown in equation 11.

$$\max \Sigma(p_{ic}(t,\tau) - c_i(t))Q_{ic}(t,\tau) \tag{11}$$

In equation 11, the summation is taken over all optimized price groups i and customer classes c and all t and $\tau$. Alternatively, revenue may be optimized. In this case, part utilization will be maximized, i.e., the carryover of part inventory from one time period to the next will be minimized. This is particularly appropriate for perishable supplies such as food commodities.

Secondary objectives of the model 28 involve minimizing oversold quantities and minimizing the unmet lower bound quantities. These objectives are captured using equations 12 and 13.

$$\min \Sigma O_i(t) \tag{12}$$

$$\min \Sigma U_{ic}(t,\tau) \tag{13}$$

In equation 12, the summation is taken over all i and t. In Equation 13, the summation is taken over all i, c, t, and τ. The optimization model 28 minimizes the oversold amount (equation 12) and then the unmet lower bound quantities (equation 13) before maximizing overall profit using equation 11.

Figure 5:
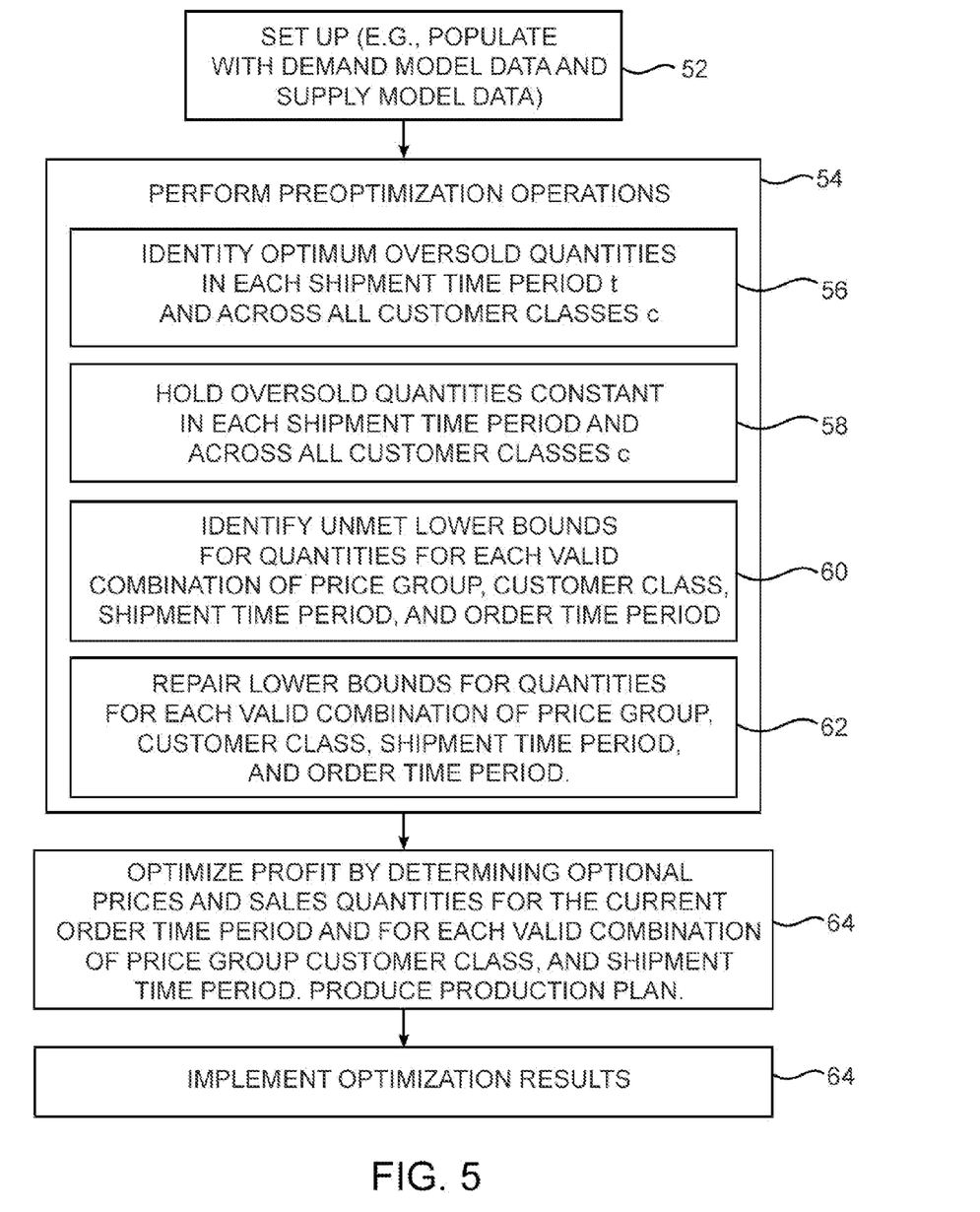
FIG. 5 is a flow chart of illustrative steps involved in using an optimization model to optimize profits in accordance with the present invention.

Illustrative steps involved in using model 28 to optimize the profit for an organization are shown in FIG. 5. During step 52, setup operations are performed. For example, tools 14, 16, and user interface 30 can be used to populate databases 12. Tools 14 may be used to create data structures (structural attributes) that capture the bills-of-material relationships between parts and products in the organization. Tools 14 may also capture other supply model data (e.g., parts inventory data, etc.). Tools 16 may be used to process sales data to produce demand curves for all optimized price groups and customer classes. User input interface 30 may be used to accept user input. User input may be used to change model parameters and other settings. By changing model settings in this way, a user can make the model more risky or more conservative and can set guidelines for the model that conform with the organization's policies and business goals.

After setup operations have been completed and databases 12 have been populated with appropriate demand model data and supply model data, optimization processing continues at steps 54 and 64. During step 54, the model 28 performs preoptimization operations. The model optimizes profit at step 64.

At step 56 of step 54, the model 28 performs optimization using equation 12, subject to the constraints of equations 1-5. The model identifies optimum oversold quantities in each shipment time period t and across all customer classes c.

At step 58, using the results of step 56, the model 28 holds the values of $O_i$ constant in each shipment time period t and across all customer classes c for the remaining steps in the procedure (i.e., model 28 "fixes" the $O_i$ values).

During steps 56 and 58, model 28 determines whether the level of committed sales exceeds parts availability. If the level of committed sales exceeds parts availability, model 28 determines the minimum overall overcommitment level and permits the overcommitment to stay at that and no higher level which allows the model to produce a valid profit maximization result during step 64.

At step 60, the model 28 performs optimization using equation 13, subject to the constraints of equations 1-5, 9, and 10. During step 60, the optimization model 28 identifies unmet lower bounds for sales quantities for each valid combination of price group, customer class, shipment time, and order time period.

At step 62, the model 28 repairs the lower bounds $QLB_{ic}(t,\tau)$ if necessary. If the lower bounds $QLB_{ic}(t,\tau)$ cannot be met using available parts, the operations of steps 60 and 62 will determine the excess amount of sales and will relax lower bound constraints until the model 28 is assured of being able to produce a valid result at step 64. Repairs are made for sales quantities for each valid combination of price group, customer class, shipment time period, and order time period.

After the preliminary optimization operations of step 54 have been performed, the model 28 performs optimization using equation 11 (step 64). The model performs optimization using equation 11 subject to the constraints of equations 1-6, 9, and 10 and, starting from that point, performs optimization using equation 11 subject to the constraints of equations 1-10. During step 64, model 28 uses the repaired and fixed values of $O_i(t)$ and $QLB_{ic}(t,\tau)$ from steps 58 and 62. The model 28 produces model results 24 (FIG. 1) that include: (1) $p_{ic}(t,1)$ (the suggested forward sales price per unit for each optimized price group i and customer class c), (2) $Q_{ic}(t,1)$ (the suggested forward sales quantity in units for each optimized price group i and customer class c), and (3) $Z_{ij}(t)$ (the optimized production plan for each valid assembly and price group combination). The organization can then use this pricing information to sell its products to various customers (step 66). By using the suggested prices, the organization adjusts the demand for each price group and customer class according to its demand curve. This ensures that the desired quantity of each product will be sold to each customer class to maximize overall revenues and profits.

During step 64, the model 28 ensures that a feasible production plan exists for producing the desired quantities of each product. The user may be provided with access to the model's production plan if desired. The production plan may be provided in any suitable form (e.g., a table of values for the production plan variables shown in FIG. 2. If desired, a user at the organization can use the model's proposed production plan suggestions to help formulate an actual production plan for producing the desired products during step 66.

The foregoing is merely illustrative of the principles of this invention and various modifications can be made by those skilled in the art without departing from the scope and spirit of the invention.

What is claimed is:

1. A method for using a profit optimization model in a computer-implemented system having a microprocessor to allow an organization that assembles multiple products from parts to optimize profit when selling the products, wherein products are organized in multiple price groups, customers to which the organization sells the products are organized in multiple customer classes, shipments of the products to the customers take place at multiple shipment times, and orders to purchase the products from the customers are received by the organization during a current order time period, the method comprising:

populating at least one database using the microprocessor with demand model data and supply model data that includes demand curve data for each of the multiple price groups and each of the multiple customer classes, wherein the supply model data includes structural attributes that define which of the parts can be used to assemble each of the products; and using the profit optimization model on the computer-implemented system to optimize the organization's profit in selling the products by determining optimal prices and sales quantities for the current order time period and for multiple combinations of price groups, customer classes, and shipment time periods, wherein the optimal prices for the multiple combinations of price groups, customer classes, and shipment time periods are identified at least in part using the demand curve data while the supply model data is used to ensure that the quantities of the products sold can be manufactured using parts available to the organization and wherein the profit optimization model is used to evaluate tradeoffs involved in selling different amounts of the products during the current time period versus holding product for later sales; and performing preoptimization operations using the profit optimization model on the computer-implemented system, wherein performing the preoptimization operations includes determining, for each of the multiple shipment time periods and for each of the multiple customer classes, whether committed sales of the products exceed how many products can be assembled from the parts that are available and, if the committed sales exceed how many products can be assembled, holding constant oversold quantity variables at levels that allow the profit optimization model to produce a valid profit optimization result.

2. The method defined in claim 1, wherein performing the preoptimization operations includes determining whether lower bound sales quantities for each product can be assembled from the parts that are available to the organization and, if the lower bound sales quantities for each product cannot be met, repairing the lower bound sales quantities for the multiple combinations of price groups, customer classes, and shipment time periods by lowering the lower bound sales quantities to levels that allow the optimization model to produce a valid profit optimization result.

3. The method defined in claim 1 wherein using the profit optimization model on the computer-implemented system to optimize the organization's profit comprises producing a production plan using the supply model data and the quantities of each product that will be demanded for the multiple combinations of price groups, customer classes, and shipment time periods.

4. The method defined in claim 1 wherein the parts available to the organization include parts already in inventory, the method further comprising using the profit optimization model on the computer-implemented system to optimize the organization's profit in selling the products while ensuring that the products can be assembled using primarily the parts already in inventory.

5. The method defined in claim 1 wherein using the profit optimization model further comprises using the optimization model to identify which prices are to be used to sell the products based at least partly on structural attribute data defining which parts are used to form each of multiple assemblies.

6. The method defined in claim 1 wherein using the profit optimization model further comprises optimizing profit by performing optimization operations on only a subset of the products sold by the organization.

7. The method defined in claim 1 wherein using the profit optimization model further comprises using user-supplied business rules in optimizing the profit.

8. The method defined in claim 1 wherein using the profit optimization model further comprises using user-supplied business rules in optimizing the profit, wherein the user-supplied business rules include at least one rule on the relative pricing of the products.

9. The method defined in claim 1 wherein using the profit optimization model further comprises using risk parameters in the profit optimization model that quantify how much profit risk the organization wants to accept for each product.

10. The method defined in claim 1 wherein using the profit optimization model further comprises:
    using at least one parameter to represent quantities of the products that have already been committed to be shipped; and
    using at least one parameter to represent a starting inventory.

11. The method defined in claim 1 wherein using the profit optimization model further comprises using demand estimation tools to extract the demand curves from sales data.

12. The method defined in claim 1 wherein the products are produced at production time periods and wherein using the profit optimization model comprises applying the profit optimization model to short lead time manufacturing wherein the production time period for each product that is produced is adjacent to or identical to the shipment time period for that product.

* * * * *